(12) United States Patent
Lee

(10) Patent No.: US 7,796,553 B2
(45) Date of Patent: Sep. 14, 2010

(54) METHOD AND APPARATUS FOR EFFICIENTLY MANAGING POWER-UP TIMER FOR HIGH-SPEED INTER-RADIO ACCESS TECHNOLOGY HANDOVER IN MOBILE COMMUNICATION DEVICE

(75) Inventor: Sang Hun Lee, Gyeonggi-do (KR)

(73) Assignee: Pantech Co., Ltd., Seoul (KR)

( * ) Notice: Subject to any disclaimer, the term of this patent is extended or adjusted under 35 U.S.C. 154(b) by 997 days.

(21) Appl. No.: 11/493,216

(22) Filed: Jul. 26, 2006

(65) Prior Publication Data

US 2007/0177546 A1   Aug. 2, 2007

(30) Foreign Application Priority Data

Feb. 1, 2006   (KR)   ............... 10-2006-0009591

(51) Int. Cl.
H04W 4/00   (2009.01)
(52) U.S. Cl. .................. 370/331; 370/335; 455/436
(58) Field of Classification Search ............. 370/331
See application file for complete search history.

(56) References Cited

U.S. PATENT DOCUMENTS

| 5,097,499 | A * | 3/1992 | Cosentino | 455/435.1 |
|---|---|---|---|---|
| 5,276,905 | A | 1/1994 | Hurst et al. | 455/33.1 |
| 6,064,889 | A * | 5/2000 | Fehnel | 455/511 |
| 6,961,559 | B1 * | 11/2005 | Chow et al. | 455/414.1 |
| 7,394,787 | B2 * | 7/2008 | Lee | 370/331 |
| 2002/0068578 | A1 | 6/2002 | Agarwal et al. | 455/452 |
| 2003/0050103 | A1 * | 3/2003 | Tourrilhes et al. | 455/574 |
| 2003/0086395 | A1 * | 5/2003 | Shanbhag | 370/331 |
| 2003/0120821 | A1 | 6/2003 | Thermond et al. | 709/250 |
| 2003/0190937 | A1 * | 10/2003 | Karmi et al. | 455/574 |
| 2004/0180660 | A1 | 9/2004 | Choi et al. | |
| 2004/0228491 | A1 | 11/2004 | Wu | 380/272 |
| 2006/0019681 | A1 * | 1/2006 | Harris et al. | 455/464 |

(Continued)

FOREIGN PATENT DOCUMENTS

CN   1774946 A   5/2006

(Continued)

OTHER PUBLICATIONS

Preliminary Search Report issued Feb. 26, 2009 by the National Institute of Intellectual Property (France) for French Patent Application No. 0606808000.

*Primary Examiner*—Rafael Pérez-Gutiérrez
*Assistant Examiner*—German Viana Di Prisco
(74) *Attorney, Agent, or Firm*—H.C. Park & Associates, PLC

(57) ABSTRACT

A method of an Inter-RAT handover between a WCDMA service and a CDMA service of a mobile communication device having a WCDMA modem and a CDMA modem, the method including: performing the WCDMA service in a WCDMA network; move from the WCDMA network to a CDMA network; determining an Inter-RAT idle roaming to the CDMA network; measuring, with a timer, a count period from a cut-off time of the WCDMA service according to the determination of the Inter-RAT idle roaming; and performing CDMA service registration according to the Inter-RAT idle roaming immediately after the cut-off time of the WCDMA service or after the count period set in the timer.

18 Claims, 6 Drawing Sheets

U.S. PATENT DOCUMENTS

| | | | |
|---|---|---|---|
| 2006/0094437 A1* | 5/2006 | Sinnarajah et al. | 455/452.1 |
| 2007/0014260 A1* | 1/2007 | Seo | 370/331 |
| 2007/0104142 A1* | 5/2007 | Kim | 370/331 |
| 2007/0110022 A1* | 5/2007 | Palenius et al. | 370/350 |
| 2007/0213055 A1* | 9/2007 | Sundberg et al. | 455/436 |
| 2009/0023449 A1* | 1/2009 | Kim et al. | 455/438 |

FOREIGN PATENT DOCUMENTS

| | | |
|---|---|---|
| EP | 1562340 | 2/2004 |
| JP | 2003-047038 | 2/2003 |
| KR | 10-2003-0023939 | 3/2003 |
| KR | 2005-34440 | 4/2005 |
| KR | 10-2005-0043559 | 5/2005 |
| KR | 10-2005-0066135 | 6/2005 |
| KR | 10-2005-0089643 | 9/2005 |
| KR | 2005-120476 | 12/2005 |
| WO | 2004-091241 | 10/2004 |
| WO | 2004/091241 A1 | 10/2004 |
| WO | 2005-089009 | 9/2005 |
| WO | 2005/089009 A1 | 9/2005 |
| WO | 2006/019269 A1 | 2/2006 |

* cited by examiner

METHOD AND APPARATUS FOR EFFICIENTLY MANAGING POWER-UP TIMER FOR HIGH-SPEED INTER-RADIO ACCESS TECHNOLOGY HANDOVER IN MOBILE COMMUNICATION DEVICE

CROSS-REFERENCE TO RELATED APPLICATIONS

This application claims the benefit of Korean Patent Application No. 10-2006-9591, filed on Feb. 1, 2006, in the Korean Intellectual Property Office, the disclosure of which is incorporated herein by reference.

BACKGROUND OF THE INVENTION

1. Field of the Invention

The present invention relates to a roaming method of a mobile communication device, and more particularly, to a method and apparatus for realizing a high-speed Inter-Radio Access Technology (RAT) Code Division Multiple Access (CDMA) handover by using Inter-RAT idle roaming when a mobile communication device is moved from another mobile communication system such as Wideband Code Division Multiple Access (WCDMA) system and Global Standard for Mobile communications (GSM) system to a CDMA system.

2. Description of the Related Art

In the current society, a communication device is used as a long-distance communication device by many people. Particularly, since the mobile communication device provides a function of conveniently communicating while a user moves regardless of a location of the user, use of the mobile communication device is generally regarded as a necessity.

Since current mobile communication devices have a highly functional processor and increased memory resources, many functions in diverse fields in addition to conventional mobile communication services are provided.

Accordingly, various mobile communication services are developed and used. Since a user uses a mobile communication device in various locations, the user often uses the mobile communication device while moving through areas supporting at least two different mobile communication services. Accordingly, a roaming operation according to a move from a current mobile communication system area to another mobile communication system area is performed. For example, there is a case in which a mobile communication device is moved from a WCDMA system to a CDMA system.

FIG. 1 is a flowchart illustrating a conventional method of switching into a CDMA service while using a WCDMA service.

Referring to FIG. 1, a conventional mobile communication device has a CDMA modem and a WCDMA modem to use a mobile communication modem corresponding to each mobile communication service area in order to use at least two mobile communication services. A process required when moving from a WCDMA service area to a CDMA service area is as follows.

The mobile communication device is located in the WCDMA service area and uses a WCDMA service (S101). In this case, since the CDMA modem is not used, the CDMA modem is maintained in an offline mode such as a power-off mode or a low power mode (LPM) and only the WCDMA modem is active (S102). The mobile communication device is moved to the CDMA service area (S103). As an example of a mobile communication device operation, a handover message from a UTRAN is received by a WCDMA procedure and a CDMA system is detected for switching to the CDMA service. The mobile communication device determines idle roaming to the CDMA service (S104). The method of determining the idle roaming may vary with implementation methods of system providing companies and device manufacturing companies. For example, a method of cutting-off the WCDMA system and accessing the CDMA system is used.

The mobile communication device enables the CDMA modem to be activated into an online mode (S105) and drives a power-up registration timer defined as a T57m timer (S106). In this case, the T57m is a constant from CDMA2000 volumes of CDMA2000 standards and may be 20 seconds. Also, the mobile communication device can not perform a registration for a period of time in which the T57m timer operates according to CDMA2000 communication standards.

The mobile communication device receives an overhead message from the CDMA system (S107). However, since the T57m timer is not canceled, registration in the CDMA system is not performed (S108). In the case the mobile communication device utilizes the CDMA service, the registration in the CDMA system has to be initially performed. When the T57m timer is canceled (S109), the mobile communication device checks a registration state and increases a power of a transmitter to perform the registration in the CDMA system (S110). If the registration is successful after increasing the power, the mobile communication device can then use the CDMA service and the WCDMA modem is established to be switched into an offline mode such as a power-off mode and a low power mode (S111), and uses the CDMA service (S112).

As shown in FIG. 1, in the conventional mobile communication device, the CDMA modem has to be switched into the online mode and perform a process such as power-up registration in order to perform the idle roaming for a handover from the WCDMA service to the CDMA service. Accordingly, a process of registering for the CDMA service may not be performed until the power-up registration timer is canceled. For example, when the mobile communication device is moved to the CDMA service area while using a WCDMA data service, the WCDMA data service can not be used while the T57m timer operates and continuity of service may not be secured if a quick handover to the CDMA service is not performed, due to an end of a application service that is time-out before the T57m.

Also, when roaming has to be performed for a handover from the WCDMA service to the CDMA service, a pilot signal of the WCDMA system is too low to maintain the WCDMA service. In this case, if the registration process with respect to the CDMA service is not quickly performed, the continuity of the mobile communication service may not be provided to a user because a success rate of receiving or transmitting is decreased.

Also, since the registration process for a roaming operation is not defined in the current CDMA standard, processes such as the power-up and registration must be performed, thereby delaying completion of a registration process due to actually performing the processes.

SUMMARY OF THE INVENTION

An aspect of the present invention provides a method of operating Inter-RAT idle roaming, which can maintain continuity of a mobile communication service in a handover from other systems such as WCDMA and GSM to a CDMA system in a mobile communication device.

An aspect of the present invention also provides a mobile communication device improving quality of wireless communication services by minimizing a mobile communication service cut-off period during a handover by operating a timer for Inter-RAT idle roaming registration.

According to an aspect of the present invention, there is provided a method of an Inter-RAT handover between a WCDMA service and a CDMA service of a mobile communication device having a WCDMA modem and a CDMA modem, the method including: performing the WCDMA service in a WCDMA network; move from the WCDMA network to a CDMA network; determining an Inter-RAT idle roaming to the CDMA network; measuring, with a timer, a count period from a cut-off time of the WCDMA service according to the determination of the Inter-RAT idle roaming; and performing CDMA service registration according to the Inter-RAT idle roaming immediately after the cut-off time of the WCDMA service or after the count period set in the timer.

According to another aspect of the present invention, there is provided a method of an Inter-RAT handover between multi-services of a mobile communication device, the method including: performing a first communication service in a first communication service network; moving from the first communication network to a second communication network; determining Inter-RAT idle roaming to the second communication network; measuring, with a timer, a count period from a cut-off time of the first communication service according to an idle roaming determination; and performing the second communication service registration according to the Inter-RAT idle roaming immediately after the cut-off time of the first communication service or after the count period set in the timer.

According to still another aspect of the present invention, there is provided a mobile communication device including: a WCDMA modem; a CDMA modem; a timer measuring a count period from a certain point of time and generating a power-up registration signal and a controller controlling a handover between a WCDMA network and a CDMA network and controlling an operation of the WCDMA modem and the CDMA modem, wherein, when moving from the WCDMA network to the CDMA network, the controller controls a CDMA service registration according to an Inter-RAT idle roaming immediately after the cut-off time of the WCDMA service or after the count period, with reference to the power-up registration signal activated after the count period set in the timer.

According to yet another aspect of the present invention, there is provided a mobile communication device having modems supporting at least two communication services, the device including: a timer measuring a count period from a certain point of time and generating a power-up registration signal; and a controller controlling a handover between multi-service networks and controlling an operation of the relevant modem for communication in the relevant network, wherein, when moving from one network for a first communication service network to another network for a second communication service, the controller controlling a registration for the second communication service according to an Inter-RAT idle roaming immediately after a cut-off of the first communication service or after the count period, with reference to the power-up registration signal activated after the count period set in the timer.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Figure 1:
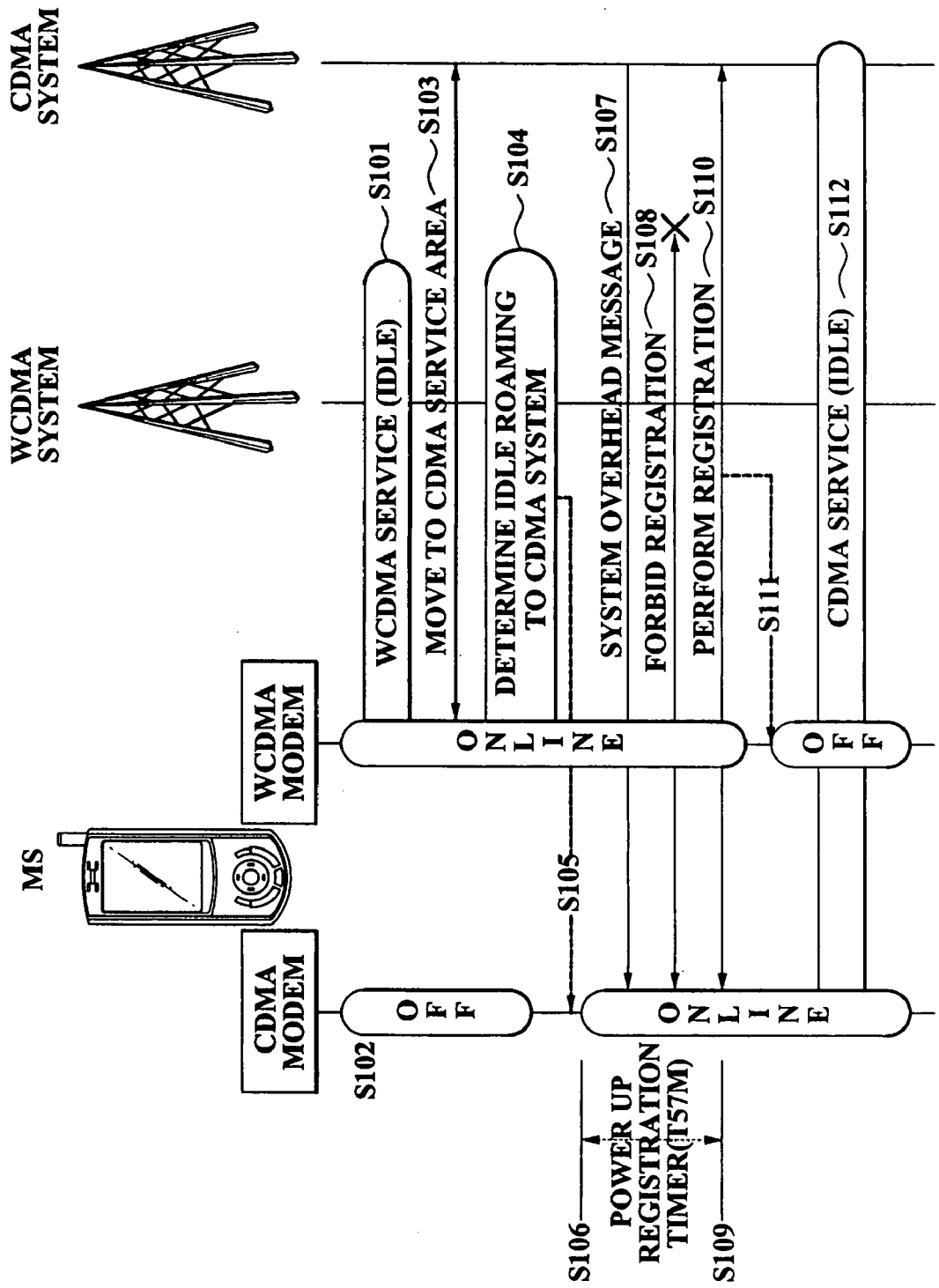
FIG. 1 is a flowchart illustrating a conventional method of switching into a CDMA service while using a WCDMA service.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, a high-speed handover method of operating a registration timer for an Inter-RAT idle roaming of a mobile communication device according to the embodiments of the present invention will be described with reference to the attached drawings. Also, while a high-speed handover system providing an operation of roaming from a WCDMA system to CDMA system is described as an example for convenience of description, it is obvious to those skilled in the art that the technical scope of the present invention may be applied as it is to a handover from a GSM system, a Universal Mobile Telecommunication System (UMTS) Terrestrial Radio Access Network (UTRAN) system, and a GSM/EDGE Radio Access Network (GERAN) system.

Figure 2:
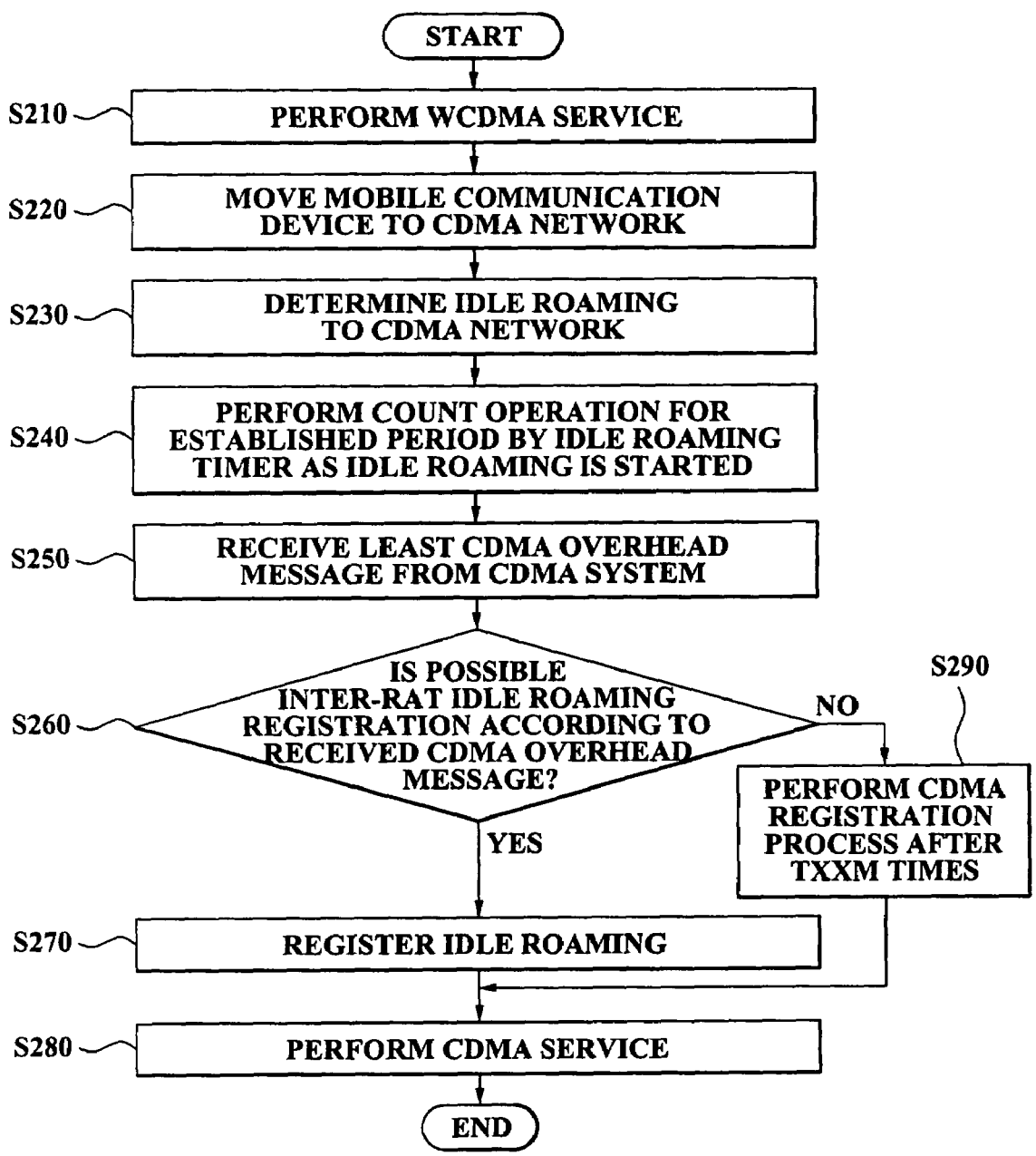
FIG. 2 is a flowchart illustrating an Inter-RAT CDMA handover operation of a mobile communication device, according to an embodiment of the present invention.
Figure 3:
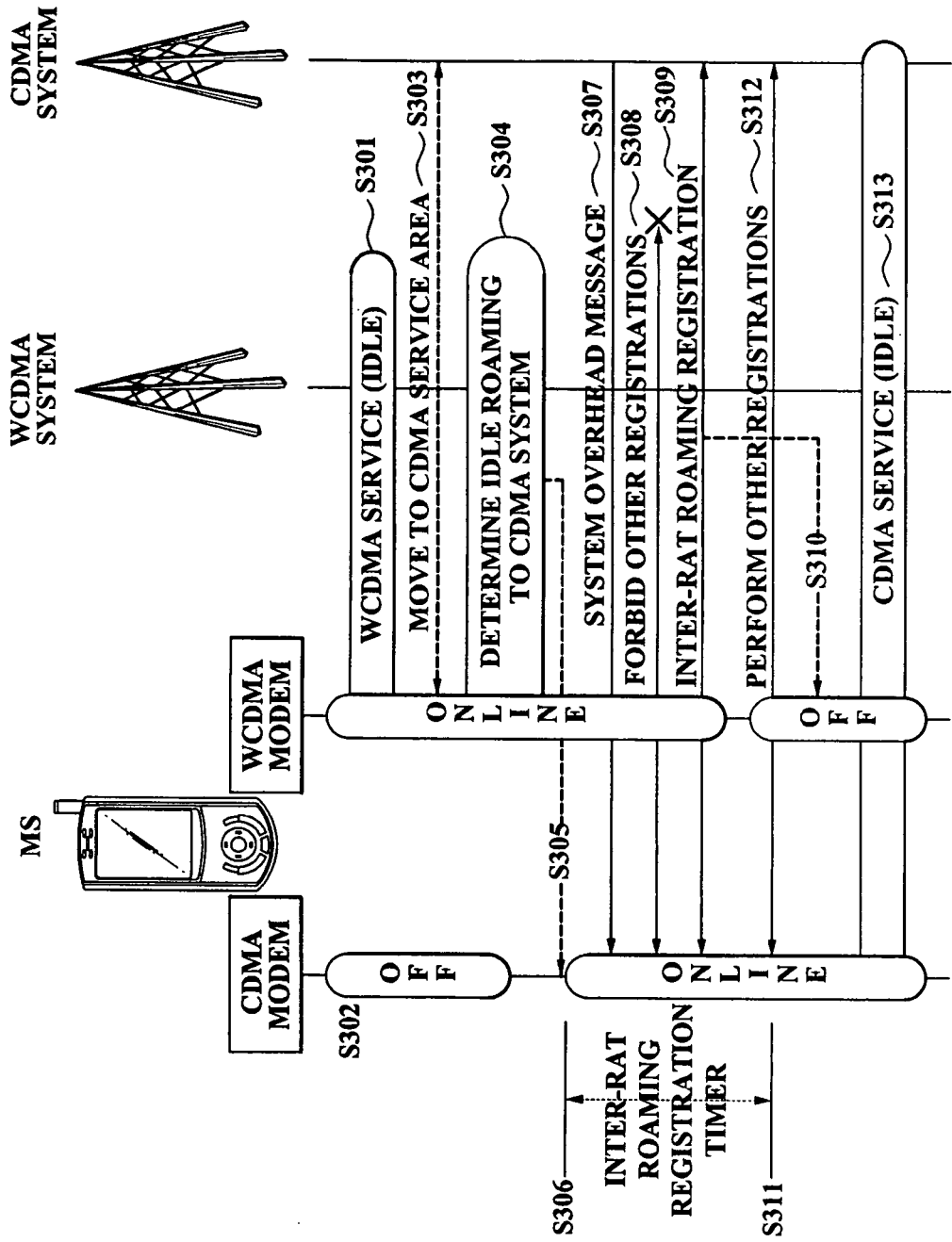
FIG. 3 is a flowchart illustrating a handover operation from a WCDMA service to a CDMA service, according to an embodiment of the present invention.

FIG. 2 is a flowchart illustrating an Inter-RAT CDMA handover operation of a mobile communication device, according to an embodiment of the present invention. FIG. 3 is a flowchart illustrating a handover operation from a WCDMA service to a CDMA service, according to an embodiment of the present invention.

A WCDMA service is performed in a WCDMA network (S210). In FIG. 3, a mobile communication device is in a state of being located in a WCDMA service area and using the WCDMA service (S301 of FIG. 3)

As illustrated in FIG. 3, the mobile communication device (ms) utilizes the WCDMA service and a CDMA service and may have a CDMA modem and a WCDMA modem to utilize the CDMA service and the WCDMA service. Also, controls with respect to the CDMA modem and the WCDMA modem to provide the high-speed handover method may vary with implementations of each mobile communication device manufacturing companies. The CDMA modem and the WCDMA modem may be maintained in an offline or online mode according to a mobile communication system to which the mobile communication device currently belongs. Also, a Radio Access Technology (RAT) indicates a wireless mobile communication system technology in a Radio Resource Control (RRC) standard of Third Generation Partnership Project (3GPP) standards, and GSM and GERAN are also a type of RAT. In the RRC standard, signaling standards of the WCDMA, an Inter-RAT handover procedure with respect to a handover between different systems is defined.

While the mobile communication device uses the WCDMA service, the WCDMA modem is in an online mode, communicating with the WCDMA system while the CDMA modem is in an offline mode (S302 of FIG. 3). As an example of an offline mode of the CDMA, there is a power-off mode or an LPM.

The mobile communication device may move from the WCDMA network to the CDMA network (S220). The mobile communication device moves from the WCDMA service area to the CDMA service area (S303 of FIG. 3). In this case, the mobile communication device is in a state in which only the WCDMA modem operates.

When the mobile communication device moves from the WCDMA network to the CDMA network, the mobile communication device determines the idle roaming to the CDMA network for a handover (S230). Namely, the mobile communication device may determine the idle roaming when communicating with the WCDMA system while approaching a border of the CDMA service area (S304 of FIG. 3). A method of determining the idle roaming to the CDMA service may vary with types of communication implementation between companies manufacturing a mobile communication system or companies manufacturing a mobile communication device. For example, when a WCDMA signal is less than a certain amplitude for a certain period of time, idle roaming to the CDMA system may be performed without mutually transmitting or receiving a specific message.

According to the determination of the idle roaming, communication connection with the WCDMA system is cut-off and the roaming operation for accessing the CDMA system may start. For this, as the idle roaming is determined, the CDMA modem is notified of the start of the roaming operation (S305 of FIG. 3), the CDMA modem may be activated to be in the online mode together with the WCDMA modem from the point in time of the notification. Also, when the roaming for accessing the CDMA system is started, a predetermined timer (hereinafter, referred to as an idle roaming registration timer), used for administration in the Inter-RAT idle roaming and registering in a base, may start (S306 of FIG. 3).

In this case, the handover of the mobile communication device to the CDMA service is completed after the registration, with respect to the CDMA system, is performed by the Inter-RAT idle roaming. Namely, when the registration according to the Inter-RAT idle roaming is not completed, if the WCDMA modem is switched into the offline mode, a failure with respect to a currently received signal of a utilized sound or data service may occur. Accordingly, only after determining the registration is completed, driving of the WCDMA modem is cut-off, thereby maintaining more stable communication services.

When the Inter-RAT idle roaming starts, the idle roaming registration timer is driven to start timing to a set period Txxm (S240). The idle roaming registration timer causes an increase of power to a transmitter Tx for performing the registration in the idle roaming. For example, the Txxm may be set as T50m, T51m, and T52m and may output a predetermined power-up registration signal (PURS) after 5, 10, and 20 seconds. As described above, the period Txxm is set to be a value for securing continuity when moving from the WCDMA service to the CDMA service. The set time Txxm may be designated as 0 seconds.

A CDMA minimum overhead message is received from the CDMA system (S250). The CDMA overhead message is a message with respect to resources required in supporting services and may be used for enhancing performance in applications in progress. Namely, for the registration to be according to the Inter-RAT idle roaming, a basic system message, such as a system parameter message and an access parameter message, is received and an ensuing registration procedure may be completed when registering in the CDMA system is possible (S307 of FIG. 3).

In this case, a registration operation may not be performed or may not allow any other registration operations to be performed, while the idle roaming registration timer is operating (S308 of FIG. 3). Namely, when the all registration operations are not allowed, the mobile communication device may enable the registration to be performed by increasing the power of the transmitter after the time Txxm set in the idle roaming registration timer.

Also, whether a registration according to the Inter-RAT idle roaming is possible is determined by the received CDMA minimum overhead message (S260), the registration of the Inter-RAT idle roaming is performed (S270 and S309 of FIG. 3), and the CDMA service is performed according to the registration (S280 and S313 of FIG. 3). In this case, communication with the CDMA system has to be performed by increasing the power of the transmitter when registering. Since the CDMA modem is used when the registration is completed, the WCDMA modem operates in an offline mode such as power-off mode or LPM mode thereafter (S310 of FIG. 3).

The Inter-RAT idle roaming registration timer operates until the mobile communication device completes registration in the CDMA modem, and the operation of the timer may be canceled when the registration is complete (S311 of FIG. 3).

As described above, according to the Inter-RAT idle roaming, a procedure for registering in the CDMA system is performed. Therefore, according to an aspect of the present invention, a registration can be performed for a period before the idle roaming registration timer reaches a set point in time and is canceled, thereby performing a handover to the CDMA service at high-speed. Accordingly, after the roaming registration, other required registrations are performed via transmitting and receiving other required resources with the CDMA system, thereby securing continuity of the mobile communication services (S312 of FIG. 3). Also, when the CDMA service starts, the WCDMA modem may operate in a standby mode to be available to switch to the online mode at any time.

Also, according to the received CDMA overhead message, whether a registration according to the Inter-RAT idle roaming is possible may be determined (S260). When the registration according to the Inter-RAT idle roaming fails, if the timer counts down to the set period Txxm and the PURS is activated, power of a wireless transmitter transmitting a communication signal from the CDMA modem may be increased to perform a registration for a handover with the CDMA system (S290). In this case, the CDMA minimum overhead message is assumed to be received from the CDMA system.

As described above, when a registration procedure is performed according to the Inter-RAT idle roaming according to an embodiment of the present invention, but before the PURS is activated, the transmitter may be powered-up to perform a roaming registration. Also, according to the method, the CDMA minimum overhead message may be received at any time regardless of when the PURS is activated. For example, when the Txxm is set to be 0 seconds, the PURS may be activated immediately after determining the Inter-RAT idle roaming, thereafter the CDMA minimum overhead message being received.

Also, according to an embodiment of the present invention, when the registration according to the Inter-RAT idle roaming is successful, the power-up registration timer may no longer be required. However, when the registration according to the Inter-RAT idle roaming is not completed before the PURS is activated, the power-up registration timer is required. The Txxm value for the time that the PURS is activated may be set to be a minimum value to secure the continuity of the services.

As describe above, when a value of the idle roaming registration timer is 0 seconds, the mobile communication device may enable the registration to be performed immediately after the CDMA modem receives a minimum message via the CDMA overhead message. Also, after the Inter-RAT idle roaming registration timer operates for a certain period and a timing operation is complete, when the CDMA minimum overhead message, such as a system parameter message and an access parameter message, is received, the registration may be performed. If the value of the idle roaming registration timer is not 0, may operate as the T57m timer according to the conventional art. Namely, when the T57m timer is not canceled yet, the registration according to the idle roaming to the CDMA system is not performed. After the T57m timer is canceled, the mobile communication device may perform a power-up of the transmitter, and the registration by checking a state of the registration. In this case, when the registration is successful, from that time, the mobile communication device may utilize the CDMA service, and switch the WCDMA modem into an offline mode.

Also, the idle roaming registration timer may be applied and used as a registration timer with respect to a data service. For example, when the mobile communication device is moved to the CDMA service area while using a WCDMA PS service, the WCDMA PS service is canceled by the timer and the registration according to the Inter-RAT idle roaming to the CDMA service is performed. However, if a handover with respect to a PS domain is not supported, the original data service may be automatically reconnected.

As described above, according to the present embodiment, in a device supporting the CDMA service and other mobile communication services such as the WCDMA service and the GSM service, when idle roaming is performed from another communication service to the CDMA system, a predetermined timer is utilized for performing a quick registration operation with respect to the CDMA system, thereby reducing a registration process period and improving service continuity.

The high-speed handover method supporting Inter-RAT idle roaming of a mobile communication device, according to an embodiment of the present invention, may be embodied as a program instruction capable of being executed via various computer units and may be recorded in a computer readable recording medium. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter. The hardware elements above may be configured to act as one or more software modules for implementing the operations of this invention.

Figure 4:
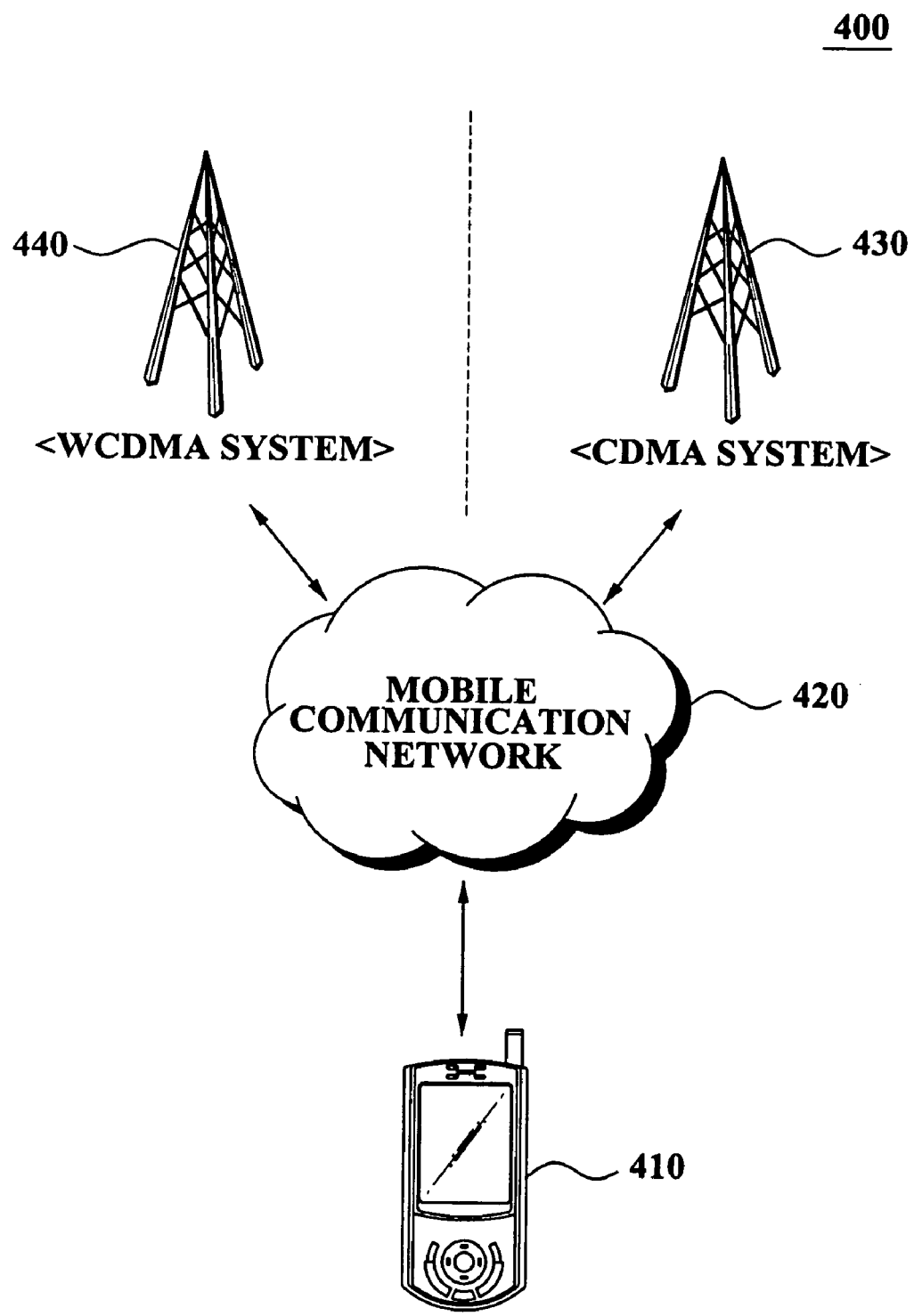
FIG. 4 is a diagram illustrating a system for a handover between networks, according to an embodiment of the present invention.

FIG. 4 is a diagram illustrating a system 400 for a handover between networks, according to an embodiment of the present invention.

Referring to FIG. 4, the system 400 includes a mobile communication device 410, a mobile communication network 420, a CDMA system 430, and a WCDMA system 440.

The system 400 operates to improve service continuity of a user by reducing a service handover registration procedure period when the mobile communication device 410 such as a cellular phone, PCS, PDA, and DMB phone is moved to the CDMA system 430 while using a mobile communication service in the WCDMA system 440 connected to several other communication network elements including an MSC, a base station, and a gateway.

For this, according to an embodiment of the present invention, the mobile communication device 410, for example, utilizes a WCDMA service in a WCDMA network environment and is moved from an area of the WCDMA network to an area of a CDMA network. In this case, for handover to a CDMA service in the CDMA network, Inter-RAT idle roaming is determined and a timer for a set certain period Txxm is initiated from a point in time of cutting-off the WCDMA service resulting from the determination of the idle roaming. In this case, the mobile communication device 410 receives a CDMA minimum overhead message from the CDMA system 430 and performs a registration when a registration in a CDMA service base station according to the Inter-RAT idle roaming is possible, thereby performing the CDMA service. Also, though an Inter-RAT idle roaming registration timer is used, since the registration may be performed regardless of whether a PURS is activated, a period interrupting the utilized mobile communication service may be minimized and service continuity may be maintained to improve a quality of wireless communication service.

The mobile communication device 410 may use the CDMA service as well as any type of mobile communication services such as WCDMA, GSM, GERAN, or UTRAN services. Accordingly, to use a mobile communication service in a relevant mobile communication system, the mobile communication device 410 may include various mobile communication modems including the CDMA modem. Also, as an example of a mobile communication device supporting various mobile communication systems, there is a Multi-mode and Multi-band (MM-MB) device utilizing the CDMA service and the WCDMA service. The MM-MB device simultaneously supports the CDMA service and other wireless mobile communication services such as WCDMA and GSM. In this case, the method of Inter-RAT idle roaming between services, according to an embodiment of the present invention, may provide improved quality of services.

Also, the mobile communication device 410 is a portable electric electronic device indicating all types of handheld based wireless communication device including a portable device capable of including a communication function, such as a Personal Digital Cellular (PDC) phone, a Personal Communication Service (PCS) phone, a Personal Handyphone system phone, a Code Division Multiple Access (CDMA)-2000 (1× and 3×) phone, a Wideband CDMA (WCDMA) phone, a Dual Band/Dual Mode phone, a Global Standard for Mobile phone, a Mobile Broadband System phone, a Digital Multimedia Broadcasting phone, a smart phone, and a mobile phone, a portable device such as a Personal Digital Assistant (PDA), a handheld PC, a notebook computer, a laptop computer, a WiBro terminal, an MP3 player, and an MD player, and an International Mobile Telecommunication (IMT)-2000 terminal providing international roaming services and widened mobile communication services. The mobile communication device 410 may include a predetermined communication module such as a wireless communication device equipped with a Global Positioning System (GPS) chip in order to track a position via a CDMA module, a Bluetooth module, an Infrared Data Association (IrDA) module, a wired/wireless LAN card, and a GPS and may perform a certain operation by including a microprocessor capable of performing a multimedia replay function. More detailed operations of the mobile communication device 410 will be described later with reference to FIG. 5.

The mobile communication network 420 indicates a communication network mutually connecting between a mobile communication device 410 and a fixed position or between mobile communication devices, to which various mobile communication theory such as a cellular mobile communication method may be applied. Also, a base station (BS) and a gateway may be also used together. The BS relays a signal transmitted/received to/from the mobile communication device 410 as a wireless station performing operations of communicating with a portable electric and electronic device. The gateway is used as a unit or device through which information between communication networks may be transmitted/received by mutually accessing a plurality of different or similar types of communication networks.

Also, the BS included in the mobile communication network 420 is land-based, and is a stationary wireless station for communicating with a land-based mobile station or a mobile relay station. The BS may include a BS system for supporting mobile communications. The BS system is divided into a BS controller (BSC) and a base transceiver station (BTS). The BSC is connected with all types of wired networks and controls the BTS, and the BTS performs wireless transmission with a mobile station. Also, the BS according to an embodiment of the present invention may be a plurality of BSs associated with the mobile communication device 410 as well as a BS corresponding to a cell which the mobile communication device 410 is within a radius of.

The CDMA system 430 is a communication system dividing limited resources for use by a multi-users. A method of dividing resources based on time is known as Time Division Multiple Access (TDMA), and a method of dividing resources based on frequency is known as Frequency Division Multiple Access (FDMA). The CDMA system uses a basic theory of a spread spectrum.

Since the WCDMA system 440 uses broadband, the WCDMA system 440 may be strong for frequency selective fading, and since the WCDMA system 440 has increased signal processing gain, signal interference may be reduced and processing capacity may be increased. Also, since a multi-path signal may be divided by a rake receiver, though a micro cell, a frequency delay in indoor environments may be overcome. Due to excellent bandwidth efficiency per 1 MHz bandwidth, subscriber capacity is high. Due to increased signal processing gain, a capacity of a power amplifier is reduced to reduce a cost. Due to a reduced size of a power amplifier, power consumption and a size of a device may be reduced.

Figure 5:
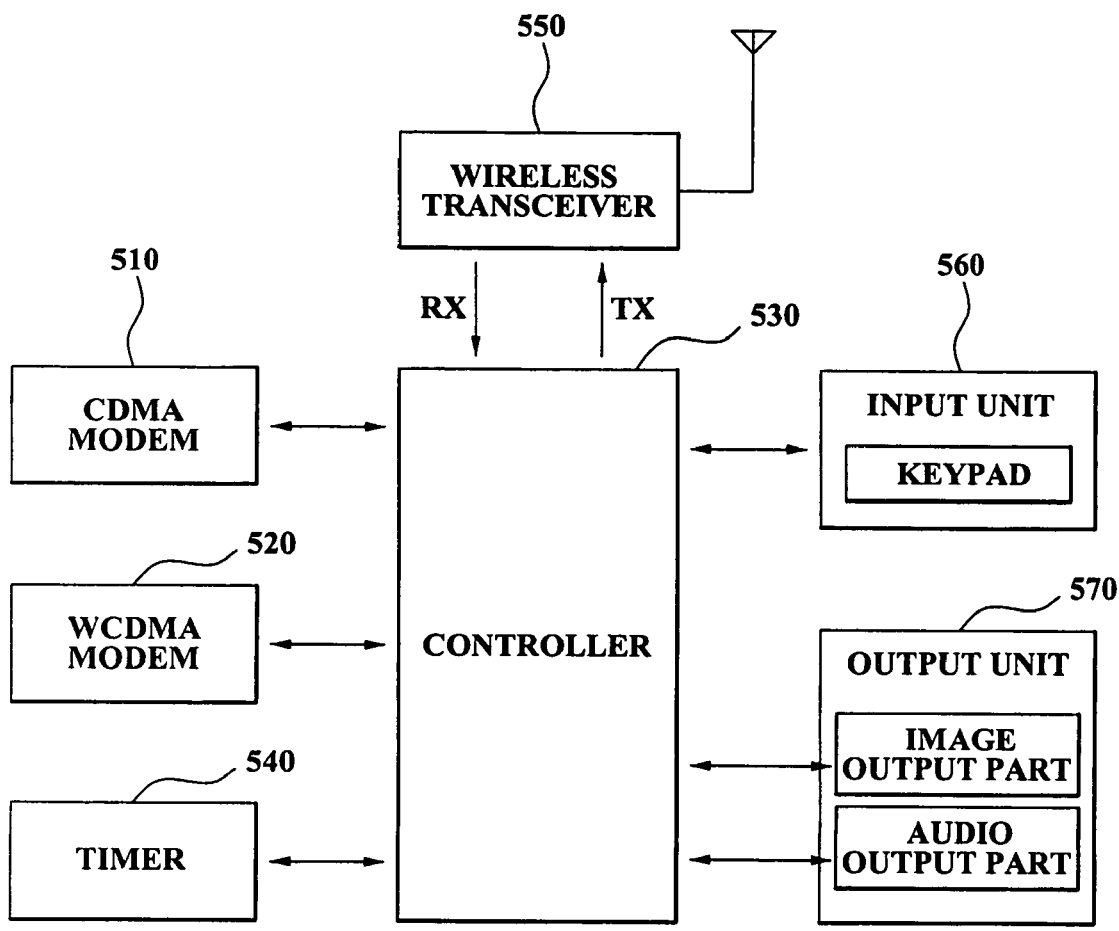
FIG. 5 is a block diagram illustrating an inner configuration of a mobile communication device of FIG. 4.

FIG. 5 is a block diagram illustrating an inner configuration of the mobile communication device 410 of FIG. 4.

Referring to FIG. 5, the mobile communication device 410 includes a CDMA modem 510, a WCDMA modem 520, a controller 530, an idle roaming registration timer 540, a wireless transceiver 550, an input unit 560, and an output unit 570.

The CDMA modem 510 is a modulator/demodulator capable of being coupled with the CDMA system 430 for CDMA communication. The WCDMA modem 520 is a modulator/demodulator capable of being coupled with the WCDMA system 440 for WCDMA communication.

The controller 530 controls all elements of the mobile communication device 410. In the present embodiment, particularly when moving from the WCDMA network area to the CDMA network area, the controller 530 enables a registration according to Inter-RAT idle roaming according to the received CDMA overhead message after cutting-off the WCDMA communication to use the CDMA service. Also, when the registration according to the Inter-RAT idle roaming fails, the controller 530 controls the registration in the CDMA BS to perform the CDMA service by increasing a power of a wireless transmitter when a PURS is activated after a set period Txxm of the idle roaming registration timer 540. Namely, the power of the wireless transmitter connected to the CDMA modem 510 and the WCDMA modem 520 is determined according to the PURS, and a communication for the registration is performed when the PURS is activated.

Accordingly, according to the Inter-RAT idle roaming, before the set count period Txxm, the controller 530 determines whether the registration should be performed, according to the CDMA overhead message received from the CDMA system. When the registration is performed according to the Inter-RAT idle roaming, the operation of the idle roaming registration timer 540 may be unnecessary, and therefore may be canceled. In this case, the controller 530 may prevent a registration for other applications, excluding the registration according to the Inter-RAT idle roaming, from a point in time of receiving the CDMA overhead message received from the CDMA system to a point in time of completing the registration according to the Inter-RAT idle roaming.

If the registration according to the Inter-RAT idle roaming is not performed, the controller 530 may control a CDMA service registration after activating the PURS.

Also, the controller 530 generally includes a processor of processing all data of a communication device associated with a modem digital signal processor (DSP). A mobile station modem (MSM), a DSP, or an open multimedia application platform (OMAP) may be used as the controller 530.

When the Inter-RAT idle roaming is determined and a set period of Txxm from time of cutting-off the WCDMA communication has been passed, the idle roaming registration timer 540 activates the PURS. According to the present embodiment, when the set period Txxm is 0 seconds, the CDMA modem 510 may enable the registration to be immediately performed by increasing a power of the wireless transmitter according to the Inter-RAT idle roaming method, as soon as receiving a minimum message via the CDMA overhead message. When the set period Txxm is not 0 seconds, after the set period Txxm has elapsed and the idle roaming registration timer 540 is canceled, the registration may be enabled to be immediately performed after receiving a CDMA minimum overhead message capable of performing the registration, such as a system parameter message and an access parameter message, by increasing the power of the wireless transmitter. Accordingly, when the set period Txxm is not 0 seconds, the idle roaming registration timer 540 may operate as the T57m according to the conventional art.

The wireless transceiver 550 may include a wireless transmitter 551 and a wireless receiver 552 (shown in FIG. 6) and may utilize a mobile communication service while transmitting/receiving to/from a BS, or may be used for transmitting or receiving certain information according to the present embodiment. The wireless transmitter 551 transmits a signal for accessing a BS, and the wireless receiver 552 receives a signal from the BS in response to the signal transmitted from the wireless transmitter 551.

Figure 6:
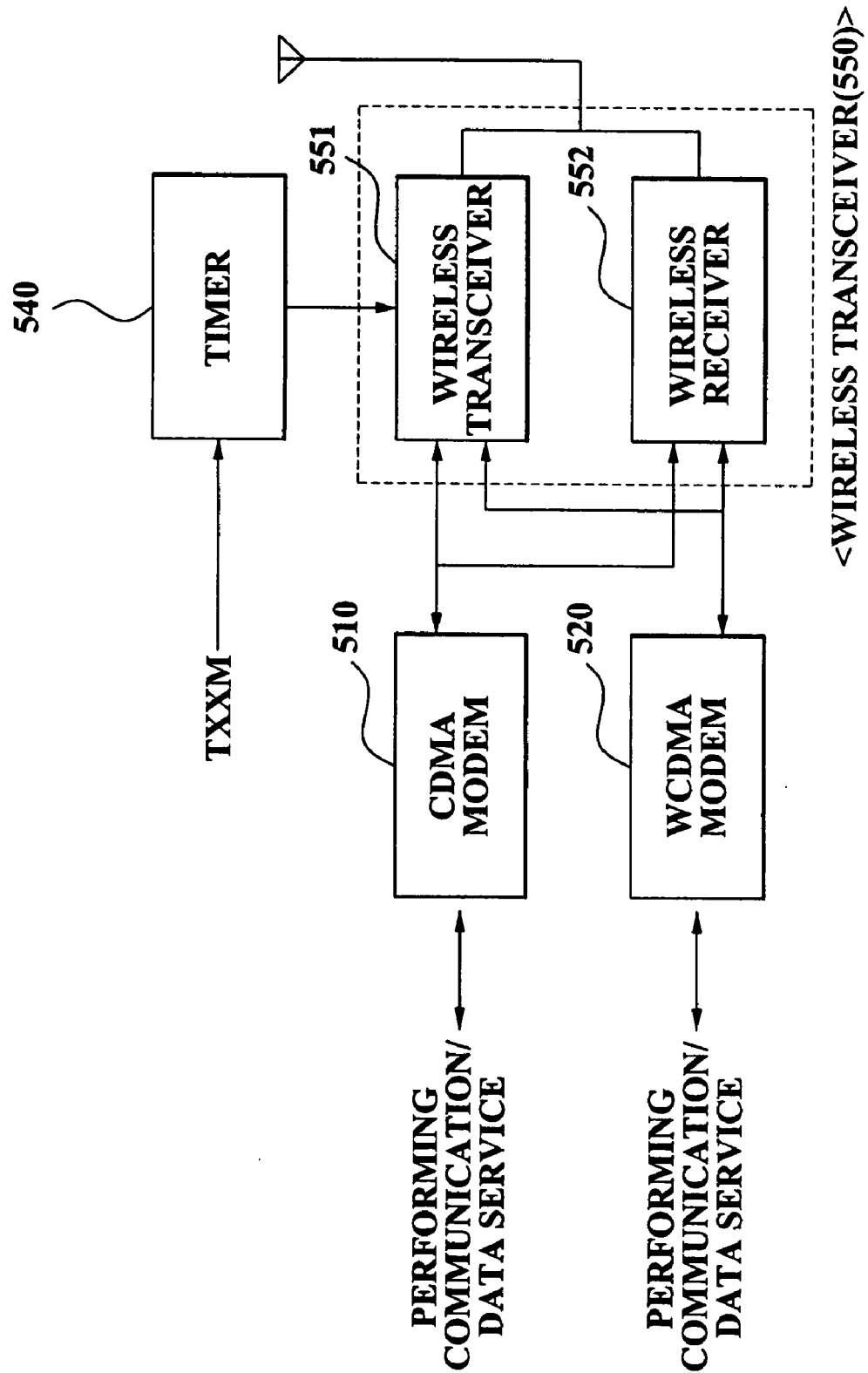
FIG. 6 is a block diagram illustrating detailed operations between modems and a wireless transceiver of the mobile communication device of FIG. 4.

FIG. 6 is a block diagram illustrating detailed operations between modems 510 and 520 and the wireless transceiver 550 of the mobile communication device 410 of FIG. 4.

Referring to FIG. 6, when the Inter-RAT idle roaming is determined and the WCDMA communication is cut-off according to an operation of the idle roaming registration timer 540 and the PURS is activated after the period Txxm from cut-off time of the WCDMA communication, the wireless transmitter 551 included in the wireless transceiver 550 may transmit a communication signal required for registration. Also, the CDMA modem 510 and the WCDMA modem 520 respectively operate when the mobile communication device 410 is located in a relevant mobile communication network area to modulate/demodulate a transmitted/received signal to perform a communication service or a data service. In this case, the wireless transmitter 551 is used for transmitting data, and the wireless receiver 552 is used for receiving data.

Namely, when the mobile communication device 410 is located in a WCDMA service area, the WCDMA modem 520 operates in an online mode and communicates with the WCDMA system 440 by using the wireless transmitter 551 and the wireless receiver 552.

If the mobile communication device 410 is out of the WCDMA service area and is moved to a CDMA service area, the idle roaming registration timer 540 operates and the CDMA modem 510 is switched from an offline mode into an online mode, thereby performing the registration according to the Inter-RAT idle roaming according to the present embodiment. In this case, the mobile communication device 410 may forbid other registrations excluding the registration according to the Inter-RAT idle roaming until the activated PURS is outputted from the idle roaming registration timer 540. After completing the registration, other registrations required for communication or data service may be performed.

Also, when the registration according to the Inter-RAT idle roaming is completed, the idle roaming registration timer 540 may be canceled. In this case, the WCDMA modem 520 is switched into an offline mode, and the mobile communication device 410 may use the CDMA service.

The input unit 560 is used for giving various types of instructions or establishing the mobile communication device 410. Also, at least one of a keypad, a touch screen, a touch pad, and a voice recognition module, or any combination thereof may be used as the input unit 560.

The output unit 570 is used for verifying establishment or certain information of the mobile communication device 410. Also, at least one of an image output part, an audio output part, and a tactile output part, which are included in the mobile communication device 410, may be used as the output unit 570. As the image output part, there may be a liquid crystal display (LCD), an organic light-emitting diode (OLED), a plasma display panel (PDP), and an light emitting diode (LED). As the audio output part, there may be a speaker and an earphone, both capable of outputting various music sounds such as a bell sound, a coloring sound, and sound data encoded in an MP3. An oscillation motor is used for the tactile output unit.

It has been described that a predetermined idle roaming registration timer of the mobile communication device is operated for a service registration according to the Inter-RAT idle roaming to perform a high-speed handover according to the present embodiment. The contents described with reference to FIGS. 2 and 3 may be applied to a handover between other networks.

As described above, in the mobile communication device according to the present embodiment, continuity of a mobile communication service may be maintained by operating a timer for registering according to Inter-RAT idle roaming when moving from a different mobile communication system to a CDMA system, thereby minimizing a period of cutting-off the mobile communication service and improving quality of a wireless communication service.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for performing an Inter-Radio Access Technology (RAT) handover between a Wideband Code Division Multiple Access (WCDMA) service and a Code Division Multiple Access (CDMA) service in a mobile communication device having a WCDMA modem and a CDMA modem, the method comprising:
    performing the WCDMA service in a WCDMA network;
    moving from the WCDMA network to a CDMA network;
    determining an Inter-RAT idle roaming to the CDMA network;
    measuring, with a timer, a count period from a cut-off time of the WCDMA service according to the determination of the Inter-RAT idle roaming;
    receiving a CDMA minimum overhead message; and
    performing CDMA service registration according to the Inter-RAT idle roaming before the timer is canceled if the CDMA service registration is possible according to the CDMA minimum overhead message.

2. The method of claim 1, wherein, when the CDMA service registration according to the Inter-RAT idle roaming is successful, an operation of the timer is canceled.

3. The method of claim 1, wherein when the CDMA service registration according to the Inter-RAT idle roaming is not successful, the CDMA service registration is performed after the set count period.

4. The method of claim 1, wherein registrations for other applications in addition to the CDMA service registration according to the Inter-RAT idle roaming are not performed, from a point of time in which the CDMA minimum overhead message is received from a CDMA system to a point of time in which the CDMA service registration according to the Inter-RAT idle roaming is completed.

5. The method of claim 1, wherein all registrations including the CDMA service registration according to the Inter-RAT idle roaming are not performed, from a point of time in which the CDMA minimum overhead message is received from a CDMA system, to a point of time in which the CDMA service registration according to the Inter-RAT idle roaming is completed.

6. The method of claim 1, wherein the set count period has a value for securing continuity of transfer from the WCDMA service to the CDMA service.

7. The method of claim 1, wherein the set count period has a value of 0 or a certain amount in seconds.

8. The method of claim 1, wherein when starting the CDMA service, the WCDMA modem is in an off-line mode.

9. The method of claim 8, wherein the offline mode is a power-off mode or a low-power mode.

10. The method of claim 1, wherein when starting the CDMA service, the WCDMA modem operates in a standby mode.

11. The method of claim 1, wherein the CDMA minimum overhead message includes a system parameter message or an access parameter message.

12. A method for performing an Inter-Radio Access Technology (RAT) handover between multi-services of a mobile communication device, the method comprising:
performing a first communication service in a first communication service network;
moving from the first communication network to a second communication network;
determining Inter-RAT idle roaming to the second communication network;
measuring, with a timer, a count period from a cut-off time of the first communication service according to an idle roaming determination;
receiving a minimum overhead message from the second communication network; and
performing the second communication service registration according to the Inter-RAT idle roaming before the timer is canceled if the second communication service registration is possible according to the minimum overhead message.

13. A mobile communication device, comprising:
a Wideband Code Division Multiple Access (WCDMA) modem;
a Code Division Multiple Access (CDMA) modem;
a timer to measure a count period from a certain point of time and to generate a power-up registration signal; and
a controller to control a handover between a WCDMA network and a CDMA network and to control an operation of the WCDMA modem and the CDMA modem,
wherein, when moving from the WCDMA network to the CDMA network, the controller controls a CDMA service registration according to an Inter-Radio Access Technology (RAT) idle roaming before the timer is canceled if the CDMA service registration is possible according to a CDMA minimum overhead message.

14. The device of claim 13, wherein a power of a transmitter connected to the modems is determined according to the power-up registration signal and a communication for the registration is performed before the power-up registration signal is activated.

15. The device of claim 13, wherein when the registration according to the Inter-RAT idle roaming is successful, an operation of the timer is canceled.

16. The device of claim 13, wherein when the CDMA service registration according to the Inter-RAT idle roaming is not successful, the controller controls the CDMA service registration after the power-up registration signal is activated.

17. The device of claim 13, wherein the controller controls the CDMA service registration so that registrations for other applications in addition to the CDMA service registration according to the Inter-RAT idle roaming are not performed from a point of time in which the CDMA minimum overhead message is received from a CDMA system to a point of time in which the CDMA service registration according to the Inter-RAT idle roaming is completed.

18. A mobile communication device having modems supporting at least two communication services, the device comprising:
a timer to measure a count period from a certain point of time and generating a power-up registration signal; and
a controller to control a handover between multi-service networks and to control an operation of the relevant modem for communication in the relevant network, wherein, when moving from one network for a first communication service network to another network for a second communication service, the controller controls a registration for the second communication service according to an Inter-Radio Access Technology (RAT) idle roaming before the timer is canceled if the second communication service registration is possible according to a minimum overhead message.

* * * * *